United States Patent [19]

Jurgensen et al.

[11] Patent Number: 5,329,583
[45] Date of Patent: Jul. 12, 1994

[54] ENHANCED AUTOMATIC CALL DISTRIBUTION SYSTEM OPERATION

[75] Inventors: Janice H. Jurgensen, Chicago; Wayne A. Senneke, Aurora, both of Ill.

[73] Assignee: AT&T Bell Laboratories, Murray Hill, N.J.

[21] Appl. No.: 906,955

[22] Filed: Jun. 30, 1992

[51] Int. Cl.$^5$ .............................................. H04M 1/64
[52] U.S. Cl. ................................... 379/266; 379/265; 379/67
[58] Field of Search .................. 379/265, 266, 88, 89, 379/67, 201, 214

[56] References Cited

U.S. PATENT DOCUMENTS

| | | | |
|---|---|---|---|
| 4,150,255 | 4/1979 | Theis et al. | 379/84 |
| 4,328,396 | 5/1982 | Theis | 379/71 |
| 4,497,979 | 2/1985 | Phelan | 379/266 |
| 4,800,583 | 1/1989 | Theis | 379/67 |
| 4,982,420 | 1/1991 | Theis | 379/68 |
| 5,033,077 | 7/1991 | Bergeron et al. | 379/67 |
| 5,166,974 | 11/1992 | Morganstein et al. | 379/266 |
| 5,181,236 | 1/1993 | LaVallee et al. | 379/266 |
| 5,185,782 | 2/1993 | Srinivasan | 379/266 |

OTHER PUBLICATIONS

M. A. Vanandel, "While You're Away, AUDIX Will Answer", *AT&T Technology*, vol. 3, No. 3, pp. 34-41.
"The Smart Way To Sell Paradise", Inbound/Outbound Magazine, Cover story by Cameron Ives, Aug. 1989, pp. 20-24.

*Primary Examiner*—James L. Dwyer
*Assistant Examiner*—Ahmad F. Matar
*Attorney, Agent, or Firm*—Werner Ulrich

[57] ABSTRACT

The exemplary embodiment is in an Automatic Call Distributor (ACD). Incoming calls to a system with no available agents can be placed in a queue, or in a departure from the prior art, can be terminated to voice mail. Voice mail messages are classified into different priority queues according to called number, keyed DTMF digits from the calling customer, and the calling number. The voice mail calls are delivered to the agent based upon the priority of the voice mail queue after the agent completes a call or after he/she logs in following a log out period. The voice mail calls can be terminated to a team of agents.

17 Claims, 4 Drawing Sheets

ENHANCED AUTOMATIC CALL DISTRIBUTION SYSTEM OPERATION

TECHNICAL FIELD

This invention relates to automatic call distributors (ACDs) and more specifically to arrangements for improving operations of such systems.

PROBLEM

Businesses frequently serve their customers through the use of automatic call distributor (ACD) answering sites which allow incoming calls, for example, for placing orders, to be routed to one of a plurality of agent positions for handling each call. Such ACD arrangements usually have the property that if an agent is available, an incoming call will be completed to that available agent and if no agent is available the call is queued. If there is no room in the queue, a busy signal is returned.

Modern ACD systems frequently have the ability to handle different types of incoming traffic using different teams of agents. For example, an airline might have one team of agents for providing arrival time information, a second team of agents for handling domestic reservations, and a third team of agents for handling international operations. Frequently, there are arrangements whereby traffic from one team of agents, for example the team handling international reservations, can be overflowed to members of another team, for example the team handling domestic reservations. In some cases, traffic for different ones of these teams is recognized because a different number is dialed; elsewhere, the customer is asked to identify the type of traffic by keying in a number. In either case, the traffic is categorized and routed to different teams and/or placed in different queues. These arrangements work well unless the amount of traffic incoming to the ACD becomes large or if the length of time required to wait for an agent to become available becomes too long. If no agents are available and the queue is full the customer is given a busy signal; if the queue is not full, the incoming call is entered in the queue and the customer has to wait until all calls ahead of him in the queue are served. As a result, during heavy traffic customers are frustrated either through having to wait excessively long in the queue or through having to make repeated attempts to complete the call, or both.

A number of suggestions have been made for alleviating this condition. A service described in D. Lee, U.S. Pat. No. 4,788,715, issued Nov. 29, 1988, describes an arrangement wherein customers are informed of the length of time that they may expect to wait in a queue. A customer can then decide whether to wait or to try again at a different time. However, a remaining problem of the prior art is that when an ACD receives excessive traffic, customers are frustrated through having to wait an excessive or indeterminate time until they are served.

Solution

The above problem is alleviated and an advance is made over the prior art in accordance with the teachings of applicants' invention wherein, during busy times, callers may be routed to a voice mail system for leaving a message. Advantageously, such an arrangement frequently allows a customer to transact a portion of his or her business immediately and to receive a phone call at a later time without having to wait on a held telephone connection. Advantageously, this arrangement allows for the implementation of a number of features for optimally serving traffic initiated via a voice mail message to the ACD.

In accordance with one aspect of the invention, a caller is given the option of waiting in the queue or immediately leaving a voice mail message. Advantageously, callers who are willing to be called back avoid all wait on held connections.

In accordance with another aspect of the invention, different voice mail queues are used to store calls of different priority. The different priority may be selected by call type (as specified either by the directory number or by the customer's initial indication of a call type as keyed in response to an initial inquiry) or the priority may be specified by the caller as an indication of the importance attributed to the call by that caller. Additionally, priority waiting calls can be placed in different priority queues if the system recognizes the caller's telephone number as received either by incoming call calling line identification (ICLID), or as entered by the caller in response to an announced prompt.

In accordance with another aspect of the invention, agents and/or supervisors have the ability to inspect queues. In the case of a supervisor, the management information system may provide additional information such as the number, age, directory numbers, and length of message of the various calls in the queue and statistical information concerning these queues.

In accordance with another aspect of the invention, queues may be established for teams or individuals. For example, a particular caller as recognized by the caller's directory number may be assigned to a queue which is normally processed by the particular agent but which in the absence of that agent may be processed by a suitable alternate.

In accordance with another aspect of the invention agents can be alerted as to the status of voice mail queues either on a steady basis in one window of a CRT or LCD display or upon request by the agent when the agent temporarily arranges not to accept incoming calls. As a result of an agent inspection of a queue and the agent's spotting of a call whose message should be heard immediately, the system provides the agent the capability for listening to that voice mail message immediately.

In accordance with another aspect of the invention an agent is identified by the agent's login. Traffic is routed to that agent in accordance with the routing algorithms of the ACD regardless of where that agent sits. Thus, for example, it is possible for an agent to work from home and receive the same traffic that the agent would receive if he or she were in the centralized agent location, as described in P. Danielsen, U.S. Pat. No. 5,073,890, issued Dec. 17, 1991.

In accordance with another aspect of the invention the priority of the waiting call queue is considered along with the priority of active call queues and calls in the voice mail queues are automatically routed at the appropriate times to agents of the appropriate teams. The order in which individual agents or agents in teams accept calls from different queues can be flexibly assigned as described, for example, in M. Glapa et al., U.S. Pat. No. 4,757,529, issued Jul. 12, 1988 (Glapa).

DETAILED DESCRIPTION

Figure 1:
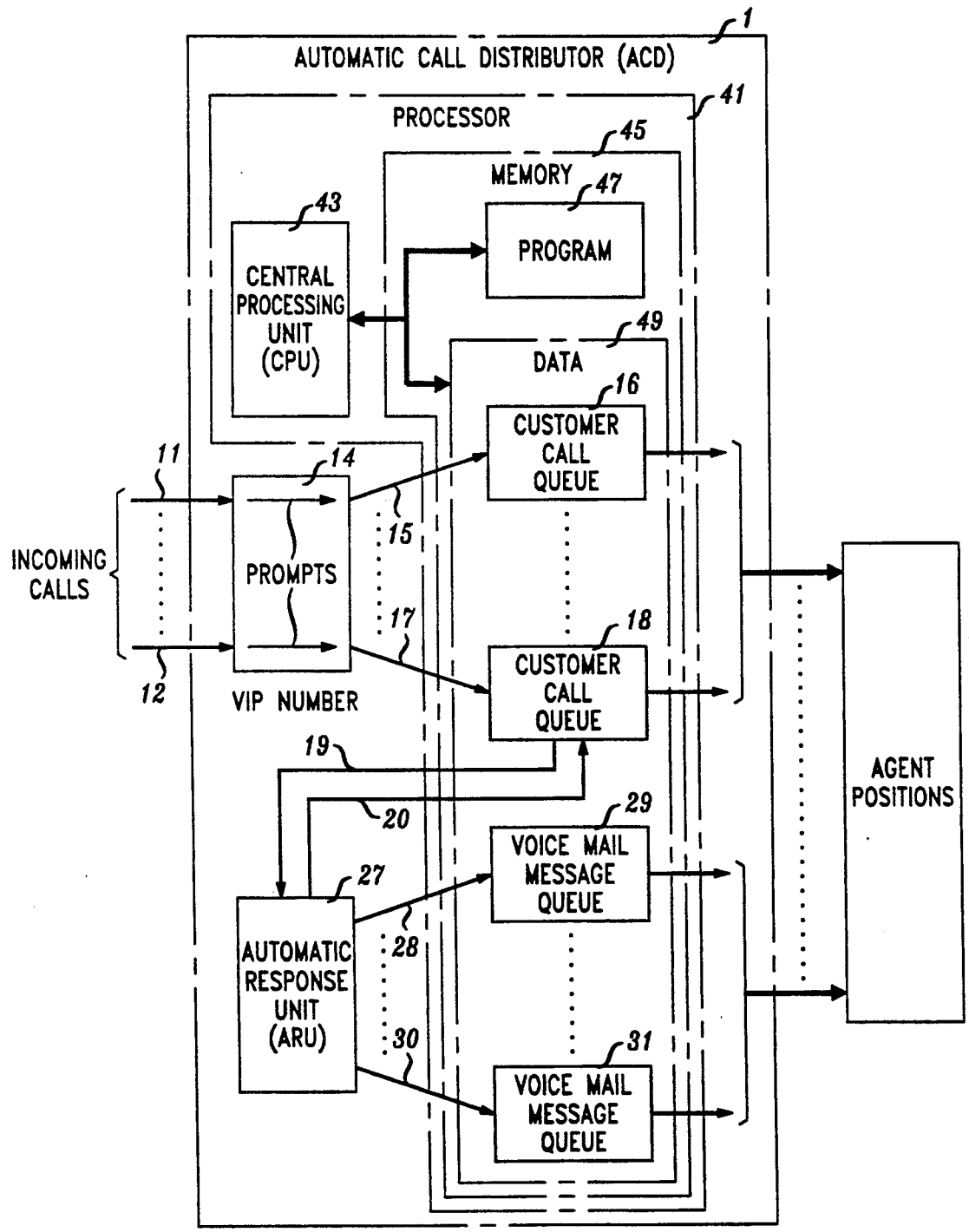
FIG. 1 is a block diagram of the operation of applicants' invention.

FIG. 1 is a diagram of the operation of the system of applicants' invention. The ACD for this exemplary embodiment is the Pinnacle TM ACD controlled by a 5ESS ® switching system, and manufactured by AT&T Network Systems. An incoming call (11, 12) is received in an ACD 1. Optionally, if calls of several categories share a common called number, then the system prompts (14) the caller to key in a digit identifying the category of the call. Based on this category, the call is routed (15, 17) to an appropriate customer call queue (16, 18). When the customer enters this queue, the customer is connected (19) to an automatic response unit (ARU) 27 and selects whether to wait until an agent becomes available or to leave a voice mail message. By using a feature such as the "vectoring" feature available in AT&T's Pinnacle TM ACD product, the customer can periodically decide whether to switch from waiting to leaving a voice message. If a call is transferred from a call queue to a message queue, the time stamp of the call is transferred to the message queue so that messages for the earlier calls are given preference over those for later calls. If the caller elects to wait, then the call is placed (20) in a queue (18) and the call is processed conventionally. If the caller has dialed a special number (a VIP number) the caller is immediately placed in a queue such as queue 18 which may be a high priority queue. If the caller elects to leave a voice mail message, then the caller is connected to an automatic response unit to select the appropriate voice mail message queue (29, . . . , 31) for storing voice mail from the caller, and places (28, 30) control information for accessing the voice message in that queue (29, 31). The information requested by ARU 27 of the customer can be additional information to sub-categorize the type of call and/or information to identify the caller's priority wishes. Further, the particular voice mail queue selected can also be influenced by the caller's directory number and priority information stored for that directory number.

The automatic call distributor is controlled by a processor 41 comprising a central processing unit 43 and memory 45, the memory containing a control program for controlling the operations of the ACD 47 and data 49, the data including the queues 16, . . . , 18 and 29, . . . , 31.

Figure 2:
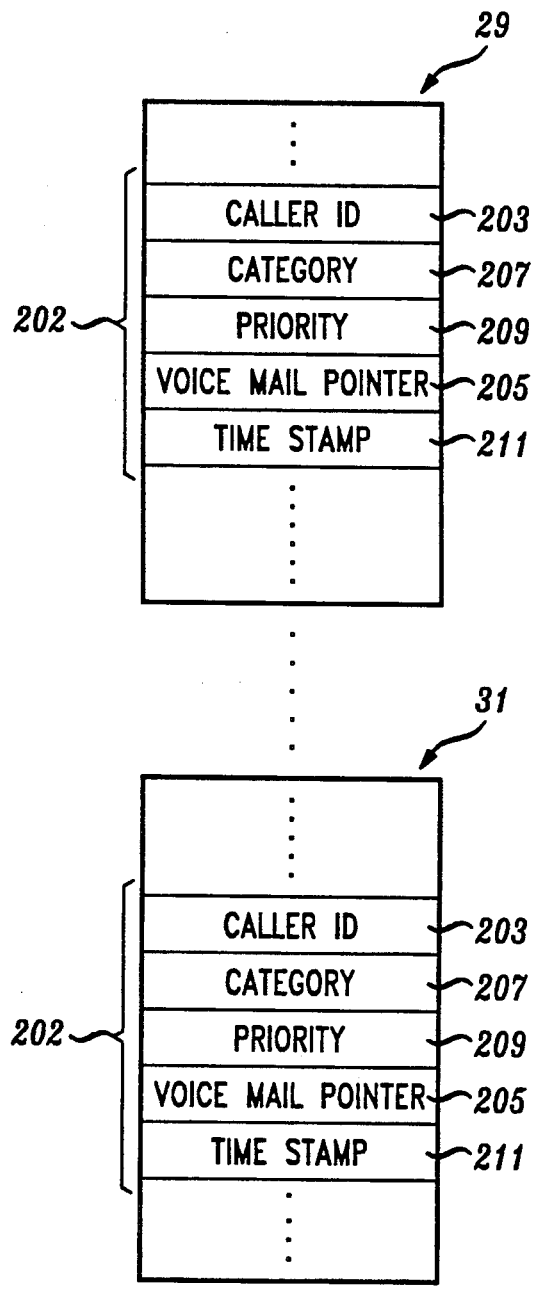
FIG. 2 shows layouts of voice mail message queues for implementing applicants' invention.

FIG. 2 illustrates the contents of the voice mail queues. The voice mail queues (29, . . . ,31) contain information (202) identifying the caller (203), the category and priority of the call (207, 209), and the location in mass storage 205 of the digital data representing the actual voice message.

Each queue (29, . . . , 31) represents a unique overall priority of call. In accordance with the principles of flexible and rotatable prioritization as described, for example, in Glapa the automatic call distributing system has a priority for each of the voice message queues and uses that priority along with the priority of active call queues to select the next call that each agent is to handle. Therefore, sometimes an agent will automatically be connected to a call from an inbound call queue and sometimes the agent will receive the voice mail message from one of the voice mail queues. In addition, the agent has the ability to request the data identifying calls in different voice mail queues and to select a particular call from a particular queue.

When an agent becomes idle and does not enter an agent call selection mode, the automatic call distributing system selects the next call or voice message to be connected to the agent. The selection is made on the basis of the priority of the queue containing the call or voice message, and, where appropriate, the prior history of calls or messages taken from one of the queues and passed on to an agent of the team to which the idle agent belongs.

Figure 3:
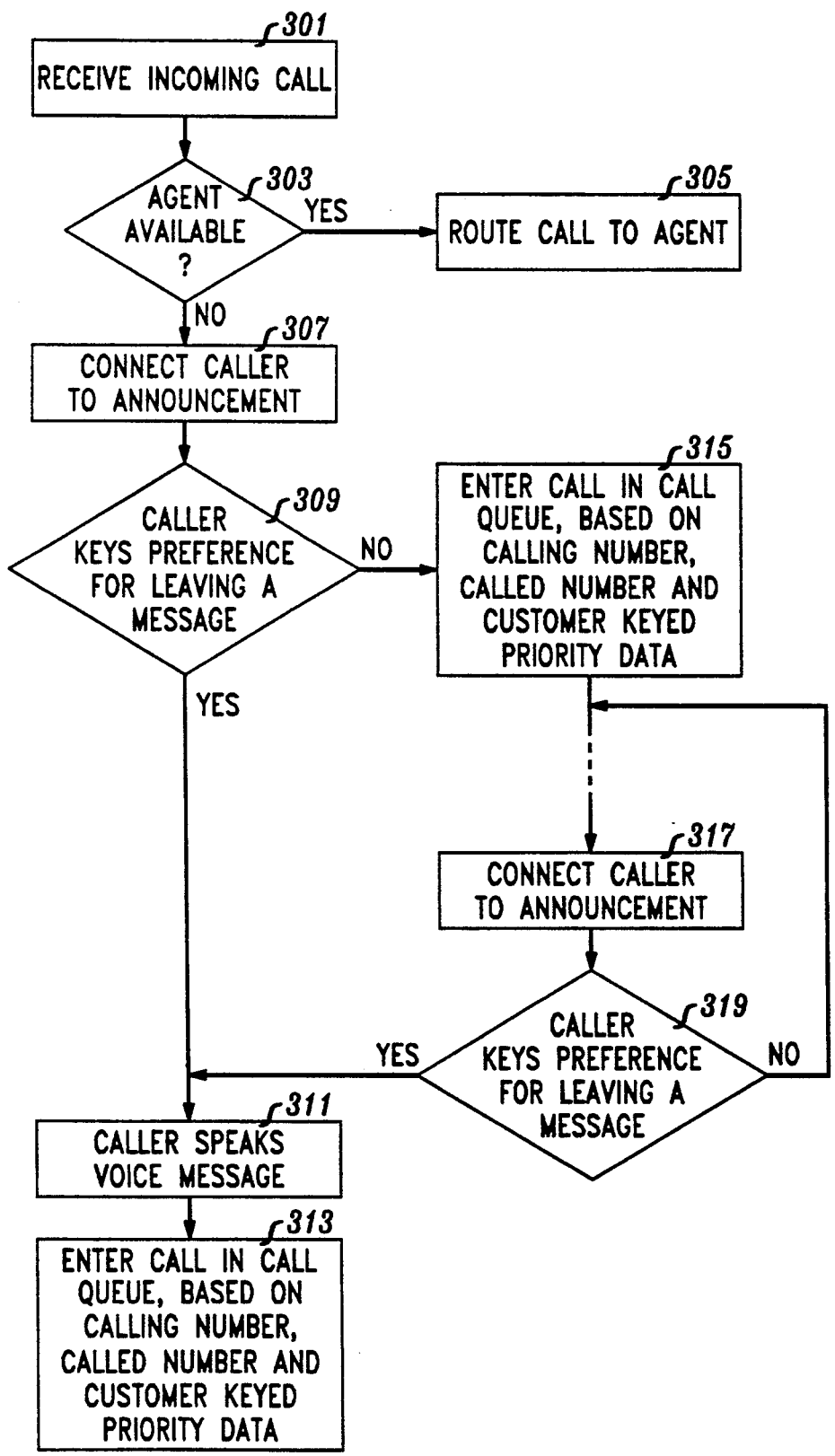
FIG. 3 is a flow diagram illustrating the processing of an incoming call in an automatic call distributor.

FIG. 3 is a flow diagram of the processing of an incoming call to the ACD. The incoming call is received (action block 301) and test 303 determines whether or not an agent is available to handle the call. If so, the call is routed to an agent (action block 305) and the call is processed in the conventional manner for calls to an ACD with an idle agent available. If no agent is available, then the caller is connected to an announcement 307 and the caller is prompted to key a preference for leaving a message or for being queued to wait for the availability of an agent. The prompting announcement may indicate to the caller the expected length of time that the caller would have to wait for an agent to become available. If the caller does not key a preference for leaving a message by failing to key a signal such as *M (for Message), then the call is entered in the appropriate call queue (action block 315). The appropriate call queue is selected based on the calling number (if this number has been received by automatic number identification and if the ACD has a list of preferred customers), on the called number (if the ACD handles different types of calls such as order and complaints based on different called directory numbers), and on a customer keyed priority data (for letting some or all customers indicate that a call is a priority call). While the call is in the queue, it is periodically connected to an announcement (action block 317) to allow the caller to key a preference for leaving a message (test 319). If the caller does key a preference, then the call is transferred to the message processing procedure starting with action block 311. If the caller does not key a preference, then the call remains in the call queue and sometime later the caller is again given a chance to key his preference.

If the caller does not key a preference for leaving a message, then the caller is connected to a message processing system and the caller voice speaks a voice message. After the voice message has been recorded, a call record will be entered into a massage queue (action block 313), the selection of the message queue being based on the calling number in case the ACD has received that number by automatic number identification and has special arrangements for giving higher priority to preferred customers based on the called number if the ACD handles several types of calls such as orders and complaints based on different incoming directory numbers and customer keyed priority data if the ACD permits certain or all customers to elevate the priority of their request. The call will be time stamped, preferably with the time the call was originally received, but alternatively, with the time that the caller started or finished recording the voice message.

Figure 4:
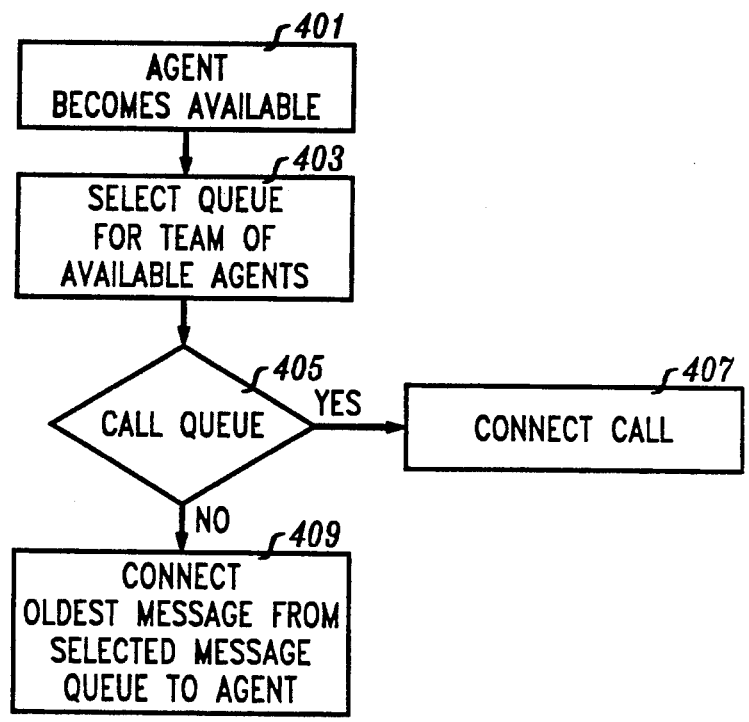
FIG. 4 illustrates the selection of a call from a message or a call queue when an agent becomes available.

FIG. 4 is a flow diagram of actions performed when an agent becomes available. If the agent becomes available (action block 401) the system selects the first queue to be processed for the team of agents of which the available agent is a member. If the first queue is a call queue as determined in test 405, then the call is connected and processed in the conventional way (action block 407). If it is not a call queue, then the oldest message from the selected message queue is connected to the agent (action block 409). Tf the queue selected in action block 403 is empty, the system will automatically select the next queue in the priority order for that team of agents and repeat the processing of blocks 405, 407, and 409. The team of the available agent is defined by the login that the agent used when the agent is attached to the system and is therefore independent of the particular agent position that the agent occupies.

The process of selecting the queue for which a call will be processed can either be on the basis of a strict priority (highest priority first) or on the basis of a rotating arrangement wherein a first queue for the team is selected for a first call, a second queue for the team for a second call and either the first or a third queue for the team for the third call, etc., until a cycle of selection of queues has been completed. (This type of operation has been described extensively in Glapa.)

Figure 5:
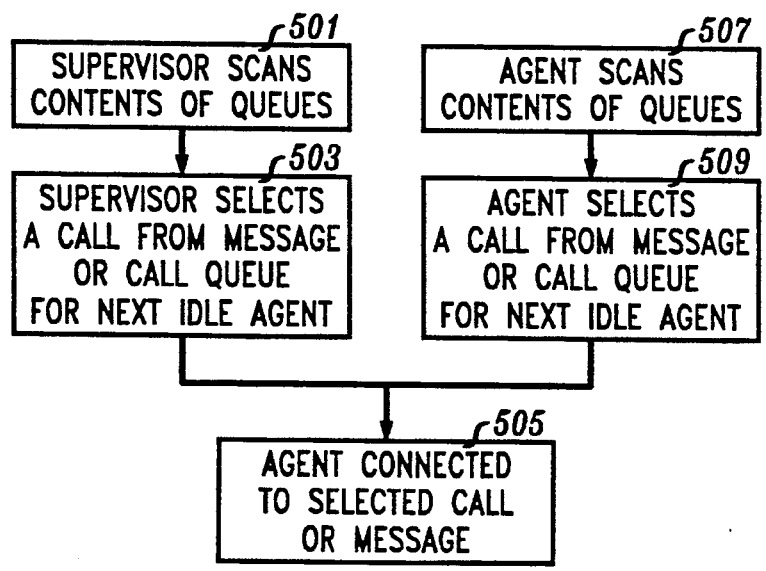
FIG. 5 illustrates the process of manually selecting a queued call or voice message.

FIG. 5 shows arrangements for manually selecting calls to be processed. In block 501, the supervisor scans the contents of the queues and in block 503 the supervisor selects a call from a message or a call queue for processing by the next idle agent of one or more teams. When such an agent becomes available, that agent is connected to the selected call or message (action block 505). Alternatively, an agent scans the contents of the queues (action block 507) and the agent selects a call from a message or call queue (action block 509) and is then connected to the selected call or message (action block 505).

The ACD also has arrangements for controlling a queued call or message waiting indicator. These indicators may be combined or separate. Though these indicators are sent to all agents of teams for processing calls in particular call or message queues, they are especially useful for informing an agent who is not in the automatic reception mode (for example, because the agent is making outgoing calls) of the presence of calls or messages waiting so that the agent can log on and receive calls or messages automatically, or scan and select a call or message as described with respect to FIG. 5.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. An automatic call distributor (ACD) comprising:
a plurality of first queues for storing information identifying calls to be answered when an agent becomes available and a plurality of second queues for storing voice mail control information for calls for which callers have left a voice message; and
processor means, operative under the control of a program, for routing calls from one of said first queues and from one of said second queues to available agents in accordance with a priority scheme for appropriately giving preference to said first or said second queues;
wherein said preference is sometimes given to one of said second queues even if one of said first queues is not empty.

2. The ACD of claim 1 further comprising an automatic response unit for promoting a caller to request an indication of whether said caller prefers to wait or to be connected to a voice mail system; and
responsive to receipt of an indication that said caller prefers to be connected to a voice mail system, connecting said caller to said voice mail system and entering said call into one of said second queues.

3. The ACD of claim 1 wherein a plurality of second queues are available and a caller stores a voice message in one of said second queues, said one of said second queues being selected in response to information supplied by said caller.

4. The ACD of claim 3 wherein said information comprises one of a plurality of directory numbers dialed by said caller.

5. The ACD of claim 3 wherein said information comprises a number keyed by said caller after being connected to said ACD.

6. The ACD of claim 3 wherein said information comprises a directory number of said caller.

7. The ACD of claim 1 wherein an agent of said ACD can access entries in said second queues and can select to receive voice mail controlled by a selected entry in said second queues.

8. The ACD of claim 1 wherein a supervisor can access said second queue and can direct specific calls from said second queue to agents of said ACD.

9. The ACD of claim 1 wherein agents of said ACD are divided into a plurality of teams and different teams give different priorities to different ones of said first and second queues.

10. A method of processing an incoming call to an automatic call distributor (ACD), comprising:
responsive to a receipt of an incoming call, and a determination that no agents are available to serve the call, offering a caller of said call an opportunity to leave a message; and
responsive to an indication that said caller requests to leave a message, connecting said caller to voice messaging means for recording a voice message;
wherein when an agent becomes available, if a voice message for said ACD has been recorded, said agent will automatically receive said recorded message if no calls are queued in the ACD for a team of which said agent is a member; and
wherein said agent sometimes receives said recorded message even if one or more calls are queued for said team.

11. The method of claim 10 wherein said offering comprises:
connecting said caller to voice processing means for prompting said caller, and said indication is a keyed dual tone multifrequency (DTMF) signal indicating that said caller wishes to record a voice message.

12. The method of claim 10 wherein a plurality of queues stores control information for recorded voice messages, and one of said queues is selected for a voice message for said call based at least partially on a directory number dialed by said caller.

13. The method of claim 10 wherein a plurality of queues stores control information for recorded voice messages, and one of said queues is selected for a voice message for said call based at least partially on a number keyed by said caller after being connected to said ACD.

14. The method of claim 10 wherein a plurality of queues stores control information for recorded voice messages, and one of said queues is selected for a voice message for said call based at least partially on a directory number identifying said caller.

15. The method of claim 10 wherein said caller repeatedly receives an offer to leave a message if said caller has not initially made a request to leave a message.

16. The method of claim 10 wherein a queue stores control information for recorded voice messages further comprising the step of an agent scanning said control information and retrieving a voice message corresponding to selected control information.

17. The method of claim 10, wherein a queue stores control information for recorded messages, further comprising:

a supervisor scanning said control information and directing a voice message corresponding to selected control information to an agent of said ACD.

* * * * *

UNITED STATES PATENT AND TRADEMARK OFFICE
CERTIFICATE OF CORRECTION

PATENT NO.    : 5,329,583

DATED         : July 12, 1994

INVENTOR(S)   : Janice H. Jurgensen
                Wayne A. Senneke

It is certified that error appears in the above-identified patent and that said Letters Patent is hereby corrected as shown below:

Column 6, claim 8, line 34, delete "queue" and substitute --queues--.

Column 6, claim 8, line 35, delete "queue" and substitute --queues--.

Signed and Sealed this

Twenty-seventh Day of December, 1994

Attest:

BRUCE LEHMAN

Attesting Officer    Commissioner of Patents and Trademarks